(12) United States Patent
Skinner

(10) Patent No.: US 7,610,806 B2
(45) Date of Patent: Nov. 3, 2009

(54) ELECTRONIC LEVEL GAGE ASSEMBLY

(75) Inventor: Jeffrey M. Skinner, Houston, TX (US)

(73) Assignee: Jogler, Inc., Houston, TX (US)

( * ) Notice: Subject to any disclaimer, the term of this patent is extended or adjusted under 35 U.S.C. 154(b) by 0 days.

(21) Appl. No.: 11/786,268

(22) Filed: Apr. 11, 2007

(65) Prior Publication Data
US 2008/0098809 A1 May 1, 2008

Related U.S. Application Data

(63) Continuation-in-part of application No. 11/590,108, filed on Oct. 31, 2006.

(51) Int. Cl.
G01F 23/00 (2006.01)
(52) U.S. Cl. ............... 73/313; 73/290 R; 73/305
(58) Field of Classification Search ............ 73/313, 73/314
See application file for complete search history.

(56) References Cited

U.S. PATENT DOCUMENTS

| | | | | |
|---|---|---|---|---|
| 4,284,904 | A * | 8/1981 | Tetro | ............ 307/118 |
| 4,475,290 | A | 10/1984 | Colditz | |
| 5,196,791 | A | 3/1993 | Dumais | |
| 5,412,316 | A | 5/1995 | Dumais et al. | |
| 5,473,245 | A | 12/1995 | Silvus, Jr. et al. | |
| 5,848,549 | A | 12/1998 | Nyce et al. | |
| 5,986,449 | A | 11/1999 | Koski | |
| 5,998,991 | A | 12/1999 | Begin | |
| 6,018,247 | A | 1/2000 | Kelly | |
| 6,253,611 | B1 | 7/2001 | Varga et al. | |
| 6,289,728 | B1 | 9/2001 | Wilkins | |
| 6,356,071 | B1 | 3/2002 | Koski et al. | |
| 6,418,787 | B1 | 7/2002 | Eck | |
| 6,508,118 | B1 | 1/2003 | Eck | |
| 6,802,218 | B2 | 10/2004 | Patel | |
| 6,813,946 | B1 | 11/2004 | Benton | |
| 6,923,057 | B2 * | 8/2005 | Sabatino | ............ 73/313 |
| 2005/0241391 | A1 * | 11/2005 | Kull | ............ 73/313 |

OTHER PUBLICATIONS

TEMPERATURES.COM; "About Thermowells"; http:www.temperatures.com/twells.html; Apr. 9, 2007.
Babbitt; "LTM-300"; http://www.iprocessmart.com/Babbitt/ll_ltm100.htm; Nov. 10, 2005.
Babbitt International; "High Resolution Magnetostrictive Level Transmitters"; http://www.babbittlevel.com/ltm100htm; Nov. 10, 2005.
GLOBALSPEC.COM; "K-TEC AT100/200 Magnetostrictive Level Transmitter"; http://www.globalspec.com/FeaturedProducts/Detail/KTEK/AT100200_Magnetostrictive_Level_Trans.; Nov. 10, 2005.

* cited by examiner

Primary Examiner—Hezron Williams
Assistant Examiner—Mark Shabman
(74) Attorney, Agent, or Firm—John R Casperson

(57) ABSTRACT

A thermowell extends downwardly into tank liquids from the roof of the tank. A magnetostrictive wave guide probe is positioned on the inside of the thermowell and a magnetic float is slidably positioned on the outside of the thermowell. The probe is connected to a head unit containing the necessary electronics for operability which is positioned outside of the tank. The position of the float, and thus the liquid level, is remotely sensed by the probe, and the probe can be removed from the thermowell if necessary without breaking the seal of the tank.

13 Claims, 3 Drawing Sheets

ELECTRONIC LEVEL GAGE ASSEMBLY

RELATED APPLICATIONS

This application is a continuation in part of application Ser. No. 11/590,108, filed Oct. 31, 2006, the disclosure of which is incorporated by reference herein.

FIELD OF THE INVENTION

In certain aspects, this invention relates to an electronic level gage assembly for measuring liquid levels in tanks. In other aspects, this invention relates to improvements in level gages for liquids and methods for measuring liquid levels in tanks.

BACKGROUND OF THE INVENTION

Level gages are used to determine liquid levels in tanks. A sight glass positioned on the outside of the tank is suitable for many applications. Other types of level gages for tanks generally rely on electronics and/or a float for operability, and can have components positioned inside or outside of the tank.

An advantage of an electronic gage is that the level reading can be instantaneously transmitted to a remote location for a continuous level readout. The electronic level signal can also be used in automated process control. A disadvantage is that components of an electronic gage can fail or require servicing, necessitating their removal.

Since many tanks are provided on their upper ends with flanged nozzles or access ports, or can be easily provided with one, a level gage which could be installed vertically on a flanged opening would be easy to install. Because the ports or nozzles are sometimes of small diameter, a level gage transmitter capable of being installed in a small diameter port would be very desirable, since it could be installed with minor accommodation in larger diameter ports simply by carrying it on a plate sized to fit the flange.

For some types of service, such as where the tank may contain a head of toxic or flammable vapors, or be at elevated pressures, or have need to remain hermetically sealed such as for uses in the pharmaceutical or food services industries, a level gage system which permitted the electronics components of the gage to be removed from the tank while maintaining a hermetic seal on the tank would be very desirable.

OBJECTS OF THE INVENTION

It is an object of this invention to provide an electronic level gage system assembly for a tank in the form of a probe assembly and a float assembly wherein the probe assembly can be placed into or removed from service without breaking seal on the tank.

It is another object of this invention to provide an electronic level gage system assembly which can be inserted into a tank through a small opening.

It is a further object of this invention to provide methods of making and using an electronic level gage system.

It is a further object of this invention to provide electronic level gage assembly which maintains a hermetic seal on the tank when its electronic components are removed from the tank.

SUMMARY OF THE INVENTION

In one embodiment of the invention, there is provided an apparatus comprising a nonmagnetic outer tube, a magnetic annularly shaped fluid-interface-seeking float, a wave guide probe, and an electronics assembly. The nonmagnetic outer tube has an upper end and a lower end and an end cover positioned sealingly on its lower end. The float is slidably positioned on the outer tube. The wave guide probe is positioned in the outer tube. The electronics assembly is operably associated with the wave guide probe for actuating the wave guide probe and producing an electrical output signal representative of a location of the float on the outer tube. The apparatus can be usefully employed to electronically measure liquid levels in a tank.

Another embodiment of the invention provides a method for remotely determining a fluid level in a tank with a magnetostrictive wave guide probe. The method is carried out by isolating the wave guide probe from an inside of the tank by positioning a thermowell in the tank and positioning the wave guide probe inside the thermowell. A fluid interface seeking float carrying magnets is positioned on the outside of the thermowell, and the wave guide probe is actuated to remotely determine to the position of the float. Where the inside of the tank is isolated from the outside of the tank by the thermowell, the wave guide probe can be removed from the tank without breaking seal on the tank.

In a further embodiment of the invention, there is provided a method for making a device for electronically measuring liquid levels in a tank. The method is carried out by providing a tank for containing liquids which has a roof and at least one up upwardly directed nozzle forming a vertical flow path through the roof A thermowell constructed of a nonmagnetic material is positioned vertically in the tank through the nozzle. The thermowell has a lower end which is closed and is positioned near a bottom of the tank and an upper end which is sealingly connectable to the nozzle. The thermowell has a generally cylindrical outer surface and slidably carries a fluid-interface seeking magnetic float on its outer surface. The upper end of the thermowell is connected to the nozzle so as to seal the fluid flow path through the nozzle. A wave guide probe is positioned in the thermowell from the upper end. The wave guide probe extends to near the lower end of the thermowell and is operably connected with an electronics assembly positioned outside of the tank for actuating the wave guide probe and producing an electrical output signal representative of a location of the float on the thermowell. The method permits the wave guide probe to be removed from the thermowell if desired while maintaining the tank in a sealed condition.

DETAILED DESCRIPTION OF THE INVENTION

Figure 1:
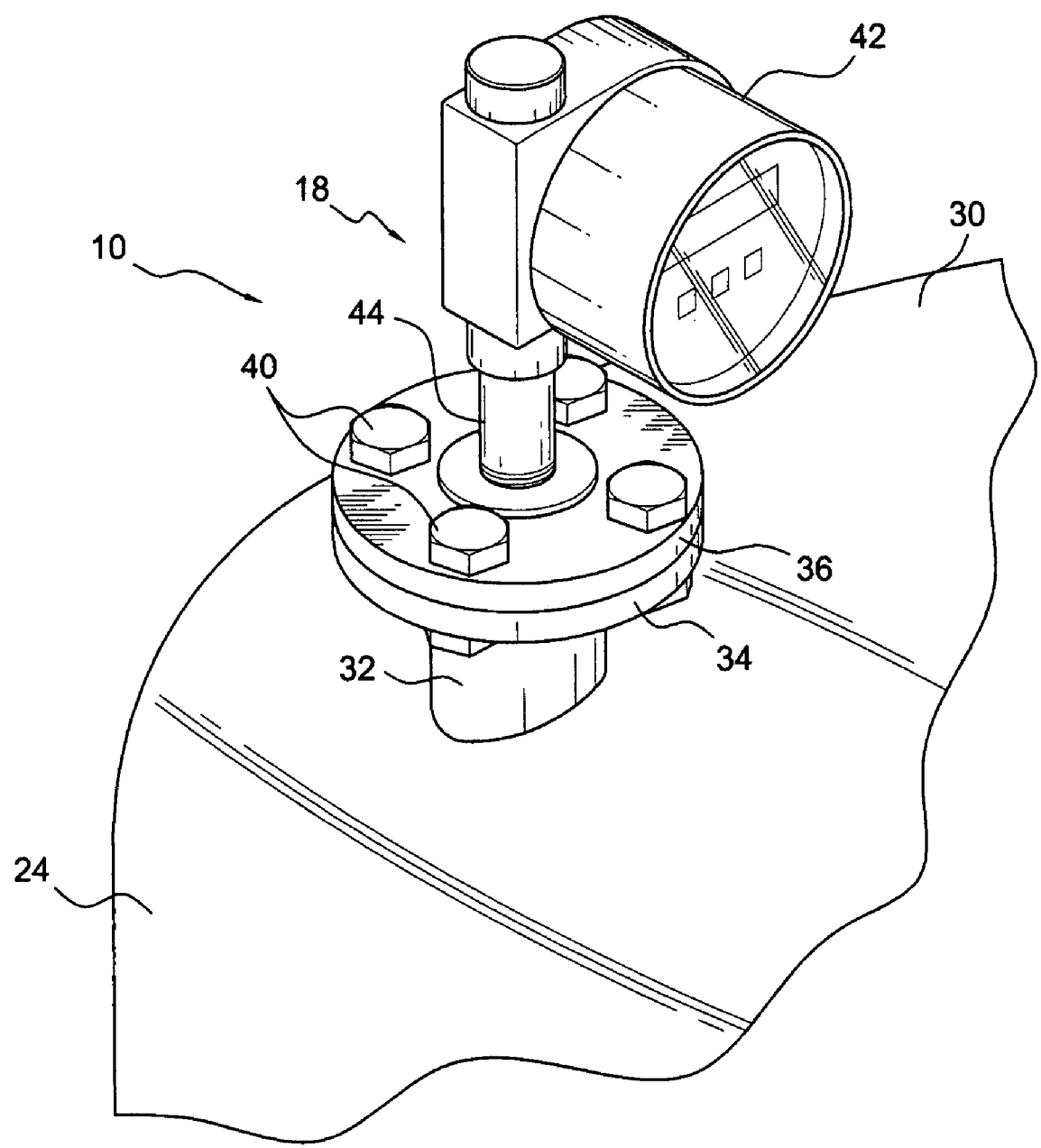
FIG. 1 is a pictorial representation of an upper portion of a tank which has been fitted with an embodiment of the invention.

In one embodiment of the invention, there is provided an apparatus 10 comprising a nonmagnetic outer thermowell tube 12, a magnetic annularly shaped fluid-interface-seeking float 14, a wave guide probe 16, and an electronics assembly 18. The nonmagnetic outer tube has an upper end and a lower end and an end cover 20 positioned sealingly on its lower end. The float is slidably positioned on the outer tube. The wave guide probe is positioned in the outer tube. The electronics assembly is operably associated with the wave guide probe for actuating the wave guide probe and producing an electrical output signal representative of a location of the float on the outer tube. The apparatus can be usefully employed to electronically measure liquid levels 22 in a tank 24.

The wave guide probe is generally tubular, and preferably has an outside diameter in the range of from about 0.25 to about 0.5 inches. The small diameter permits it to be deployed in a small inside diameter outer tube, which can carry a small outside diameter float, so that the assembly can be deployed through small openings or large.

Figure 6:
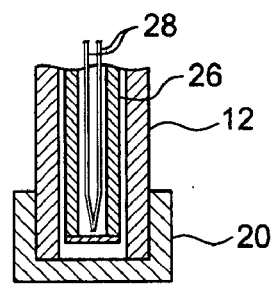
FIG. 6 is an enlarged view, taken partly in cross section, of a portion of the invention in FIG. 3, showing additional details

The wave guide system assembly comprises a nonmagnetic inner tube 26 positioned in the nonmagnetic outer thermowell tube 12, and a magnetostrictive wire 28 positioned in the inner tube 26. The magnetostrictive wire as illustrated has two legs, which are connected near the bottom of the probe. See FIG. 6. The inner tube and outer tube are preferably straight and coaxially positioned.

Figure 2:
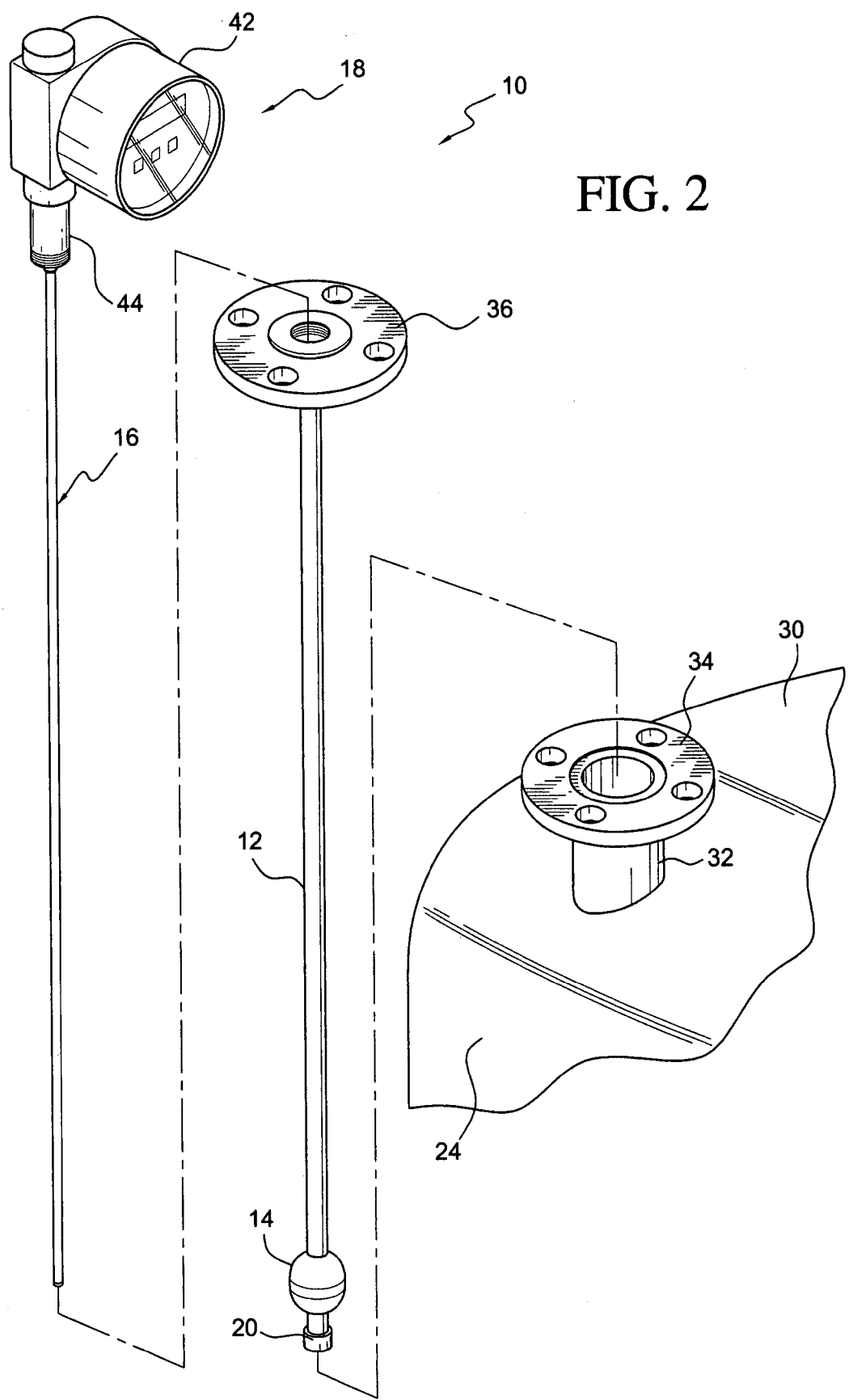
FIG. 2 is an exploded pictorial view illustrating a probe assembly and a float assembly for insertion into a tank to form an electronic level gage system assembly.
Figure 3:
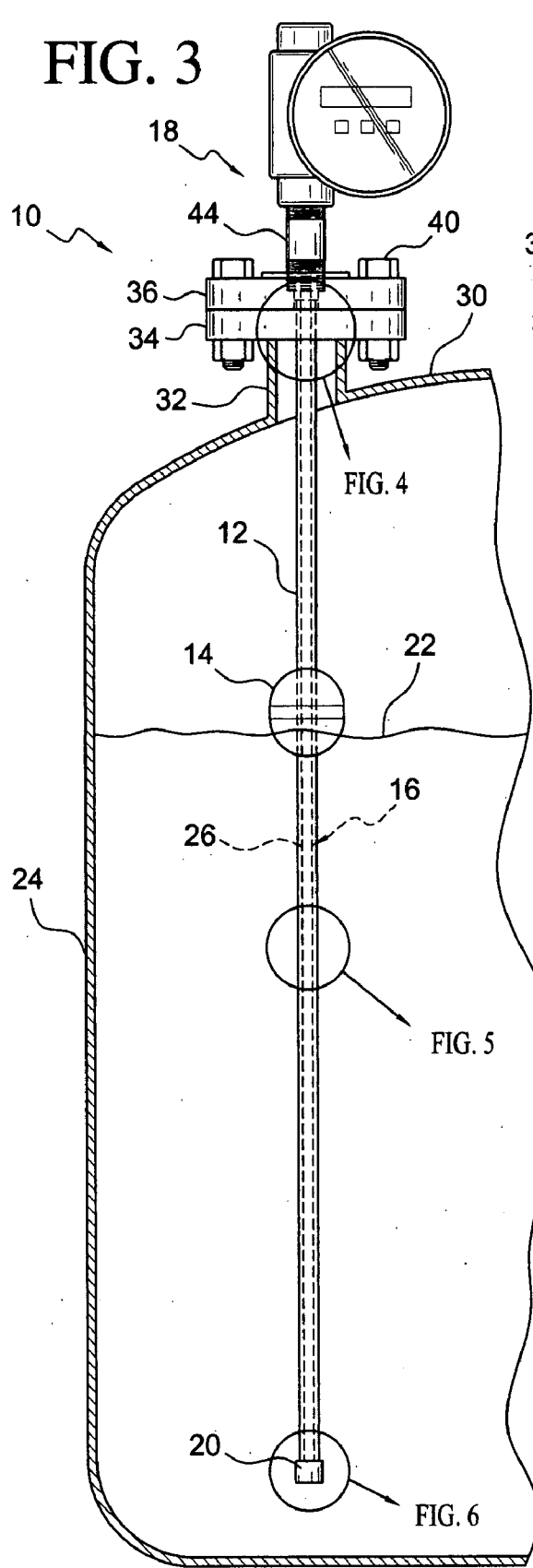
FIG. 3 is view, partly in cross-section, illustrating a level gage assembly according to certain aspects of the invention positioned in the tank.

As is apparent from FIG. 2, there is risk of float loss during installation of the device unless some means is provided for preventing loss of the float. Preferably, the outer thermowell tube has an enlarged outside diameter near its lower end sized to prevent loss of the float. In the illustrated embodiment, the end cover 20 on the outer tube comprises a welded cap fitting over the lower end of the outer tube and sealing it, and the cap is sized to prevent loss of the float. Also as is apparent from FIG. 2, the inside diameter of the nozzle must be larger than the outside diameter of the float to permit assembly and installation.

The apparatus is preferably used in combination with a tank for containing liquids. The tank comprises a tank body and a top cover 30. The top cover typically has an upwardly directed nozzle 32 having an outwardly extending nozzle flange 34 at its upper end. The outer thermowell tube 12 preferably further comprises an outwardly extending tube flange 36 at its upper end positioned in sealing engagement with the upper end flange of the nozzle. This arrangement permits the transmitter wave guide probe to be removed from the outer thermowell tube without establishing a fluid flow path into or out of the tank. The invention can be deployed through nozzles having a wide range of diameters simply by changing the diameter of the tube flange to match the nozzle flange.

Figure 4:
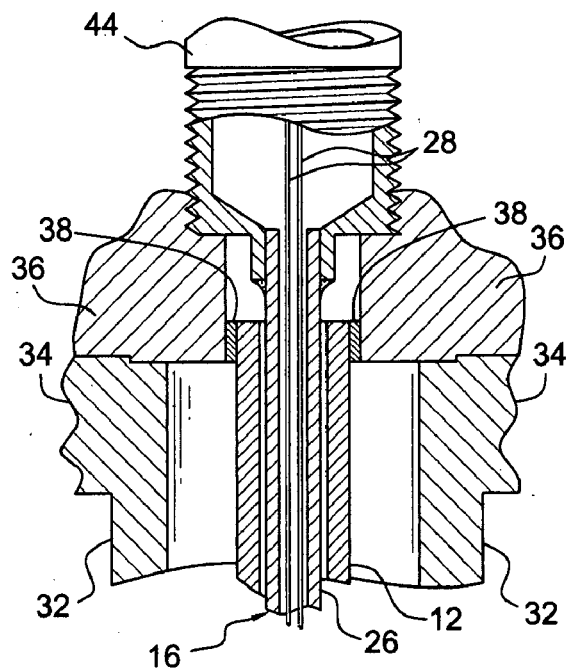
FIG. 4 is an enlarged view, taken partly in cross section, of a portion of the invention in FIG. 3, showing additional details.
Figure 5:
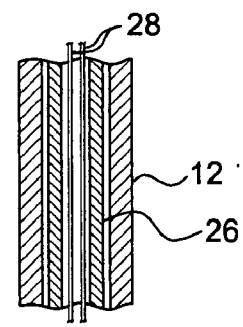
FIG. 5 is an enlarged view, taken partly in cross section, of a portion of the invention in FIG. 3, showing additional details

In the illustrated embodiment, the outer tube 12 is welded to the tube flange, see FIG. 4, weld 38, and the tube flange is bolted to the nozzle flange, see bolts 40 in FIG. 1, for example. The outer tube and flange form a configuration which is generally known in the process industry as a thermowell. However, it is not believed that a thermowell has been used in the process industry to either house a magnetostrictive wave guide probe nor to carry a magnetic float. Other means of attachment of the outer tube to the tube flange, such as threaded coupling, could be used if desired, as well as other means for attaching the tube flange to the nozzle flange, for example, a sanitary tri-clamp adapter. Also, a gasket (not shown) will generally be present between the flanges.

The apparatus preferably further comprises a housing 42 encasing the electronics assembly. The housing preferably includes a hollow stem 44 threadably connecting the housing with the tube flange 36. In the illustrated embodiment, the stem is threaded at both ends, and is provided with a nipple at its lower end. The inner tube is received by the nipple and is attached to the housing by a weld at the bottom end of the nipple.

Another embodiment of the invention provides a method for remotely determining a fluid level in a tank with a wave guide probe. The method is carried out by isolating the wave guide probe from an inside of the tank by positioning a thermowell in the tank and positioning the wave guide probe in the thermowell. A fluid interface seeking float carrying magnets is positioned on the outside of the thermowell, and the wave guide probe is actuated to remotely determine to the position of the float. Where the inside of the tank is isolated from the outside of the tank by the thermowell, the wave guide probe can be removed from the tank without breaking seal on the tank.

In another embodiment of the invention, there is provided a method for making a device for electronically measuring liquid levels in a tank. The method is carried out by providing a tank for containing liquids which has a roof and at least one up upwardly directed nozzle forming a vertical flow path through the roof A thermowell constructed of a nonmagnetic material is positioned vertically in the tank through the nozzle. The thermowell has a lower end which is closed and is positioned near a bottom of the tank and an upper end which is sealingly connectable to the nozzle. The thermowell has a generally cylindrical outer surface and slidably carries a fluid-interface seeking magnetic float on its outer surface. The upper end of the thermowell is connected to the nozzle so as to seal the fluid flow path through the nozzle. Preferably, this is accomplished by welding the outer tube 12 to its flange 36 and bolting the tube flange 36 to the nozzle flange 34, employing a gasket if necessary. A wave guide probe is positioned in the thermowell from the upper end, preferably by inserting the wave guide probe 26 until extends to near the lower end of the thermowell. The wave guide probe is operably connected with an electronics assembly positioned outside of the tank for actuating the wave guide probe and producing an electrical output signal representative of a location of the float on the thermowell. The method provides a technique for constructing equipment to electronically measure liquid levels in a tank while permitting the wave guide probe to be removed from the tank for service, repair or replacement for example while maintaining the tank in a sealed condition.

The method preferably further comprises providing a housing encasing the electronics assembly and an upper end of the wave guide probe, and connecting the housing to the upper end of the thermowell. The housing, electronics assembly, and wave guide probe preferably form a unitized structure. The housing is preferably threadably connected to the upper end of the thermowell. This permits the wave guide probe to easily be removed from the thermowell as a unit with the electronics assembly without unsealing the tank.

In a preferred embodiment, the apparatus operates according to magnetostrictive principles. The wave guide probe comprises a magnetostrictive wire positioned in a sheath, and the tank contains a liquid. An electric pulse is transmitted through the magnetostrictive wire. A torsional strain induced in the magnetostrictive wire by the magnet in response to the electric pulse is sensed. An electrical output signal representative of a position of the magnetic annularly shaped fluidinterface-seeking float is produced is produced by the electronics assembly. The signal is further representative of the liquid level in the tank.

While certain preferred embodiments of the invention are described herein, the invention is not to be construed as being so limited, except to the extent that such limitations are found in the claims.

What is claimed is:

1. An apparatus comprising
    a nonmagnetic outer tube having an upper end and a lower end and an end cover positioned sealingly on the lower end of the outer tube,
    a magnetic annularly shaped fluid-interface-seeking float slidably positioned on the nonmagnetic outer tube,
    a wave guide probe positioned in the outer tube,
    said wave guide probe comprising
    a nonmagnetic inner tube positioned in the outer tube, and
    a magnetostrictive wire positioned in the inner tube,
    wherein the inner tube and the outer tube are straight and coaxial, and
    an electronics assembly operably associated with the wave guide probe for actuating the wave guide probe and producing an electrical output signal representative of a location of the float on the outer tube.

2. An apparatus as in claim 1 wherein the wave guide probe has an outside diameter in the range of from about 0.25 to about 0.5 inches.

3. An apparatus as in claim 1 wherein the outer tube has an enlarged outside diameter near its lower end sized to prevent loss of the float.

4. An apparatus as in claim 1 wherein the end cover on the outer tube comprises a cap fitting over the lower end of the outer tube and sealing it, said cap being sized to prevent loss of the float.

5. An apparatus as in claim 1 further comprising a tank for containing liquids, said tank comprising a tank body and a top cover, said top cover having an upwardly directed nozzle having an outwardly extending nozzle flange at its upper end, wherein the outer tube further comprises an outwardly extending tube flange at its upper end positioned in sealing engagement with the upper end flange of the nozzle,
    so that the wave guide probe can be removed from the outer tube without establishing a fluid flow path into or out of the tank.

6. An apparatus as in claim 5 wherein the outer tube is welded to the tube flange and the tube flange is bolted to the nozzle flange.

7. An apparatus as in claim 5 further comprising
    a housing encasing the electronics assembly said housing including
    a hollow stem threadably connecting the housing with the tube flange.

8. A method comprising
    providing a tank for containing liquids, said tank having a roof and at least one up upwardly directed nozzle forming a vertical flow path through the roof, said nozzle having an outwardly extending nozzle flange at its upper end,
    positioning a straight thermowell vertically in the tank through the nozzle, said thermowell having a lower end which is closed and is positioned near a bottom of the tank and an upper end having an outwardly extending tube flange for sealable engagement with the upper end flange of the nozzle, said thermowell having a generally cylindrical outer surface and slidably carrying a fluid-interface seeking magnetic float on the outer surface, said thermowell being constructed of a nonmagnetic material,
    connecting the upper end of the thermowell to the nozzle so as to seal the fluid flow path through the nozzle;
    positioning a straight wave guide probe in the thermowell from the upper end thereof, said wave guide probe extending to near the lower end of the thermowell coaxially therewith and being operably connected with an electronics assembly positioned outside of the tank for actuating the wave guide probe and producing an electrical output signal representative of a location of the float on the thermowell,
    said method further comprising
    providing a housing encasing the electronics assembly and an upper end of the wave guide probe, and
    connecting the housing to the upper end of the thermowell.

9. A method as in claim 8 wherein the housing is threadably connected to the thermowell.

10. A method as in claim 8
    further comprising
    providing the wave guide probe and electronics assembly in a unitized structure and threadably connecting the unitized structure to the upper end of the thermowell.

11. A method as in claim 8,
    wherein the wave guide probe comprises a magnetostrictive wire positioned in a sheath and the tank contains a liquid,
    said method further comprising
    transmitting an electric pulse through the magnetostrictive wire,
    sensing a torsional strain induced in the magnetostrictive wire by the magnet in response to the electric pulse, and
    producing an electrical output signal representative of a position of the magnetic annularly shaped fluid-interface-seeking float.

12. A method for remotely determining a fluid level in a tank with a wave guide probe, said method comprising
    isolating the wave guide probe from liquids on an inside of the tank by positioning a thermowell in the tank and positioning the wave guide probe in the thermowell,
    slidably positioning a liquid interface seeking float carrying magnets on the outside of the thermowell, and
    actuating the wave guide probe to remotely determine to the position of the float,
    wherein the wave guide probe comprises a magnetostrictive wire positioned in a sheath.

13. A method as in claim 12 wherein the thermowell is positioned so as to isolate the liquids on the inside of the tank from the environment outside of the tank so that the wave guide probe can be removed from the thermowell without breaking seal on the tank.

* * * * *